United States Patent [19]

Sekiguchi

[11] Patent Number: 4,982,994
[45] Date of Patent: Jan. 8, 1991

[54] CORNER PATCH FOR REAR QUARTER PANEL-REAR SKIRT CORNER FOR AN AUTOMOTIVE VEHICLE

[75] Inventor: Akihiko Sekiguchi, Gunma, Japan

[73] Assignee: Fuji Jukogyo Kabushiki Kaisha, Tokyo, Japan

[21] Appl. No.: 524,543

[22] Filed: May 17, 1990

[30] Foreign Application Priority Data

May 29, 1989 [JP] Japan .................................. 1-62085

[51] Int. Cl.⁵ .............................................. B62D 25/08
[52] U.S. Cl. ...................................... 296/195; 296/30
[58] Field of Search ..................... 296/195, 203, 29, 30

[56] References Cited

U.S. PATENT DOCUMENTS

| | | | |
|---|---|---|---|
| 4,251,103 | 2/1981 | Nakajima et al. | 296/195 |
| 4,462,629 | 7/1984 | Todori et al. | 296/30 |
| 4,634,173 | 1/1987 | Aonuma et al. | 296/195 X |
| 4,875,733 | 10/1989 | Chado et al. | 296/195 |

FOREIGN PATENT DOCUMENTS

| | | | |
|---|---|---|---|
| 335150 | 3/1989 | European Pat. Off. | 296/29 |
| 151182 | 8/1985 | Japan | 296/195 |

Primary Examiner—Margaret A. Focarino
Assistant Examiner—Andrew C. Pike
Attorney, Agent, or Firm—Beveridge, DeGrandi & Weilacher

[57] ABSTRACT

A body structure of an automotive vehicle comprises a rear quarter panel outer, a rear skirt, and a patch. The patch joins the rear part of the rear quarter panel outer and a side part of the rear skirt. A sidewise extension planar portion is laterally extended from a side edge of the patch. A side end portion of the sidewise extension planar part is fixedly joined to the upper edge part of a recessed part of the rear quarter panel outer, in which a rear combination lamp is mounted. The sidewise extension planar portion and the upper part of the rear quarter panel outer form a closed sectional portion, which functions to improve the transmission of stress arising from a twisting of the vehicle body, thereby imparting rigidity to the rear end of the rear quarter panel outer.

4 Claims, 5 Drawing Sheets

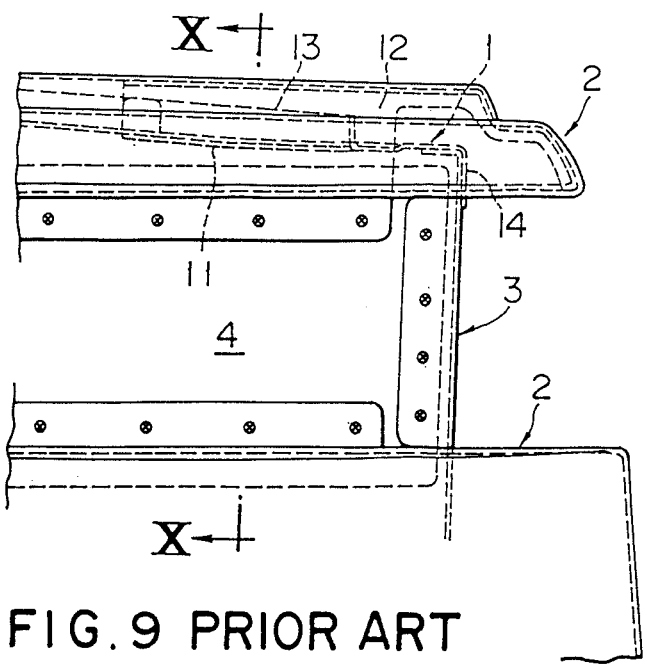
FIG. 9 PRIOR ART
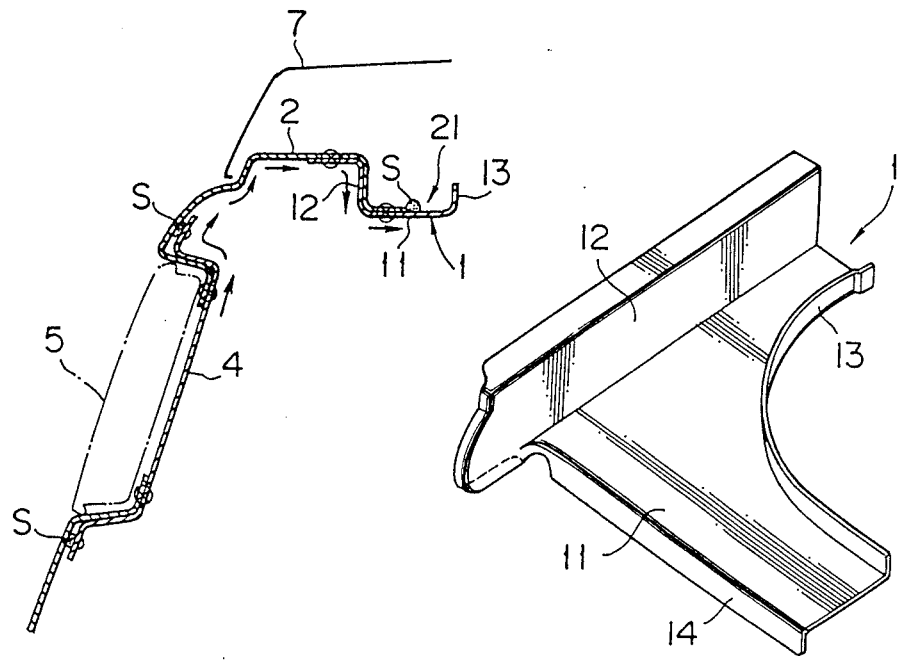
FIG. 10 PRIOR ART
FIG. 11 PRIOR ART

CORNER PATCH FOR REAR QUARTER PANEL-REAR SKIRT CORNER FOR AN AUTOMOTIVE VEHICLE

BACKGROUND OF THE INVENTION

The present invention relates generally to a vehicle body structure and more particularly to the rear skirt corner structure of an automotive vehicle body.

It has been the common practice, in the structure of the rear corner portion of an automotive vehicle body, to join the rear portion of the rear-quarter panel outer and the left and right end portions of the rear skirt by patching (using a splicing sheet or patch) as described in, for example, Japanese Patent Application Laid-Open Publication No. 151182/1985.

As conducive to a full understanding of the present invention, the nature and limitations of such patches and related construction of the prior art will first be described with respect to a typical example thereof and with reference to FIGS. 8 through 11 of the accompanying drawings, which will be briefly described hereinafter.

In the prior art, one example of the patch mentioned above is as shown in FIG. 11. The patch 1 has a planar web portion 11 with an arcuate inner edge. Along a straight side edge of the planar web 11, a bent-up portion 12 is formed. Along the arcuate inner edge mentioned above, a bent-up flange 13 is formed. Along a rear edge of the planar web 11, a bent-down flange 14 is formed. The patch 1 is of an approximately triangular shape in plan view.

As shown in FIGS. 8, 9, and 10, a drainage trough 21 of a substantially channel cross section is formed by bending at the upper inner edge of a rear quarter panel outer 2. The patch is fitted against the rear portion of the drainage trough 21 and is thus spot-welded to the patch 1. A substantially channel cross section formed by the bent-up portion 12, the planar portion 11, and the bent-up flange 13 of the patch 1 is adapted to the shape of the drainage trough 21. Furthermore, a portion of substantially Z-shaped cross section is formed by the bent-up flange 13, the bent-down flange 14, and the planar portion 11 of the patch 1. This Z-shaped portion is fitted to a rear skirt 3 of similar Z-shaped cross section and spot-welded thereto. A numeral 7 designates a trunk lid.

By this construction, a bent-up inner edge face 21a of the drainage trough 21 of the rear quarter panel outer 2, which is a rim of an opening of a trunk room, and a bent-up inner edge face 3a of the rear skirt 3 are connected via the bent-up flange 13 of the patch 1. Thus, the rear quarter panel outer 2 and the rear skirt 3 are in joined state.

In the known structure described above, the patch 1 and the rear quarter panel outer 2 are mutually joined by spot-welding each other from an open section as shown in FIG. 10. For this reason, when the vehicle body is subjected to a twist, the load (stress) is transmitted roundabout as indicated by the arrow marks in FIG. 10. Therefore, the rigidity of such a portion is lowered.

In general, there is a type of automotive vehicle in which, as shown in FIG. 1, each rear combination lamp 5 extends to and extensively around the side face portion of the body. In a vehicle of this type, the rear end portion of the rear quarter panel outer 2 is divided into upper and lower portions by a cutout formed therein for mounting the combination lamp 5. Consequently, there is further difficulty in attaining the rigidity of the rear quarter panel outer as described above.

SUMMARY OF THE INVENTION

It is the primary object of the present invention to overcome the above described problems of the prior art.

According to the present invention, there is provided a body of structure of an automotive vehicle of the type in which the rear portion of a rear quarter panel outer and a side portion of the rear skirt are joined by a patch. In the vehicle body of this structure, a sidewise extension planar portion is extended from a side edge of a planar portion. Furthermore, a side end portion of the sidewise extension planar portion is fixedly secured to an upper edge portion of a recessed portion of the rear quarter panel outer for mounting therein a rear combination lamp. By this construction, the sidewise extension planar portion and the upper portion of the rear quarter panel outer form a closed sectional portion.

The above described construction affords the following beneficial features of utility. The rigidity of the rear portion of the rear quarter panel outer is remarkably improved by the provision of a closed sectional portion formed by the utilization of a part of the patch. Thus, the problems of the prior art described above are effectively overcome without an increase in the number of structural parts.

BRIEF DESCRIPTION OF THE DRAWINGS

FIGS. 8 through 11 are views illustrating an example of rear end structure of the prior art and respectively corresponding to FIGS. 2, 3, 4, and 6; and FIG. 10 is a sectional rear view taken along the plane indicated by line X—X in FIG. 9.

A preferred embodiment of the present invention will become understood from the following detailed description referring to the accompanying drawings.

DETAILED DESCRIPTION OF THE PREFERRED EMBODIMENTS OF THE INVENTION

Referring to FIGS. 1 through 6, a rear portion of a rear quarter panel outer 2 and left and right end portions of a rear skirt 3 are joined by a patch 1. A numeral 7 designates a trunk lid. This feature is the same as that in the prior art construction described hereinbefore.

Figure 6:
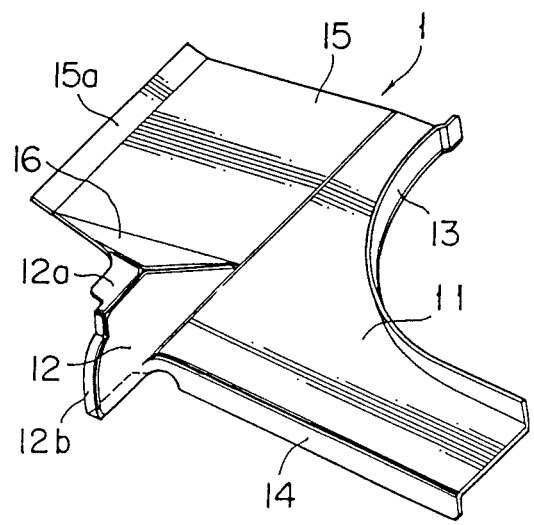
FIG. 6 is a perspective view of the patch shown in FIGS. 2, 3, and 4.

According to the present invention, as best shown in FIG. 6, the patch 1 has a planar portion 11 and a sidewise bent-up portion 12, which is only on a rearward part of a side edge of the planar portion 11. A sidewise extension planar portion 15 is extended sidewise from the frontward part of the side edge of the planar part 11. Along the side edge of the planar part 15 is formed an upwardly inclined flange 15a. Furthermore, a forwardly declining portion 16 is formed to contiguously join the forward edge of the sidewise bent-up portion 12, the forward edge of a top flange 12a at the upper edge of the bent-up portion 12, and the rear edge of the sidewise extension planar portion 15. The patch 1 is further provided with an inner bent-up portion 13 and a rear bent-down portion 14 similarly as in the known patch illustrated in FIG. 11.

Figure 4:
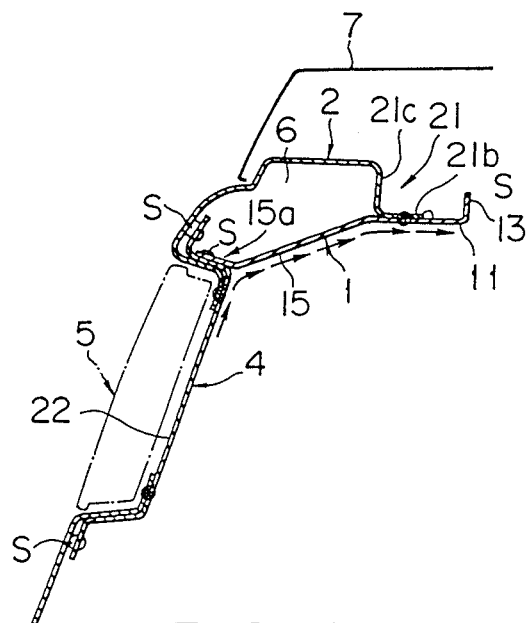
FIG. 4 is a sectional rear view taken along the plane indicated by line IV—IV in FIG. 3.
Figure 5:
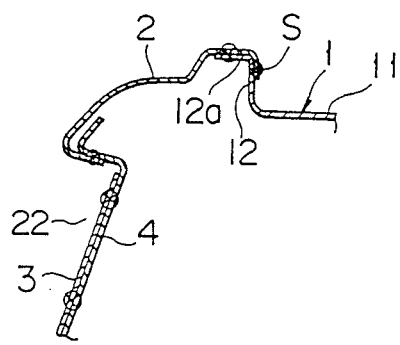
FIG. 5 is a sectional rear view taken along the plane indicated by line V—V in FIG. 3.

Referring to FIGS. 4 and 5, a recessed part 22 for mounting a rear combination lamp 5 is formed in the rear quarter panel outer 2. A bracket 4 for securing the rear combination lamp 5 is fastened by spot welding at its upper and lower portions to the upper and lower edge portions of the recessed part 22. In FIG. 4, a trunk lid 7 is shown in closed state against an indented portion of the rear quarter panel outer 2.

A water drainage trough 21 of substantially channel shape in cross section is formed at the upper inner edge of the rear quarter panel outer 2. The rear end portion of the drainage trough 21 is secured to the forward upper surface of the planar portion 11 of the patch 1. The drainage trough 21 has a bent-up inner edge portion 21a, which is fixedly secured to the front end portion of the inner bent-up portion 13 of the patch 1. Furthermore, the bottom part 21b of the drainage trough 21 extends rearward and is secured by spot-welding to the upper surface of the planar portion 11 of the patch 1. The sidewise extension planar part 15 of the patch 1 extends sidewise toward the upper rim portion of the recessed portion 22 of the rear quarter panel outer 2 as shown in FIG. 4. The flange 15a of the planar portion 15 is superimposed onto the upper portion of the bracket 4 mentioned above and is thus spot-welded to the upper rim portion of the recessed portion 22 together with the bracket 4.

Furthermore, the sidewise bent-up portion 12 and its top flange 12a are fixedly secured to the rear end portion of a side edge bent-up portion 21c of the drainage trough 21 of the rear quarter panel outer 2 and to the inner surface of the rear upper portion of the rear quarter panel outer 2. Furthermore, a rear edge flange 12b of the sidewise bent-up portion 12 of the patch 1 is fixedly secured to the upper inner surface of rear portion of the rear quarter panel outer 2.

The planar portion 11, inner bent-up portion 13, and rear bent-down portion 14 form a substantially Z-shaped part in cross section. The Z-shaped part is by spotwelded secured to the upper end of the rear skirt 3 similar to a Z-shaped part of the known patch illustrated in FIG. 11. Thus, a structure wherein the rear part of the rear quarter panel outer 2 and the rear skirt 3 are joined by the patch 1 is obtained.

Figure 1:
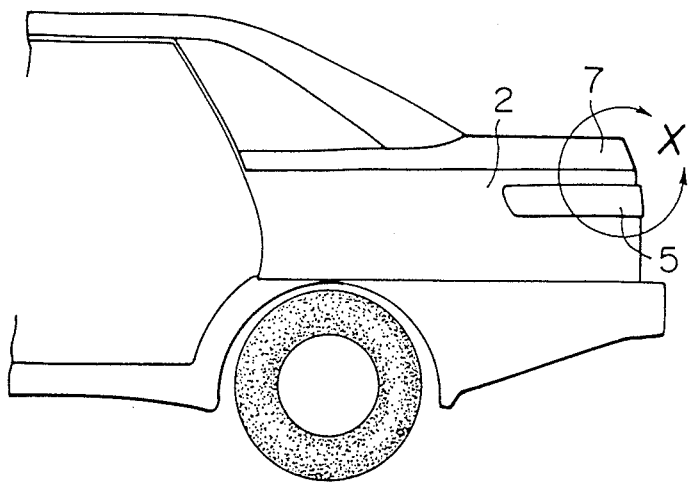
FIG. 1 is a left side view of the rear end portion of an automotive vehicle body.
Figure 2:
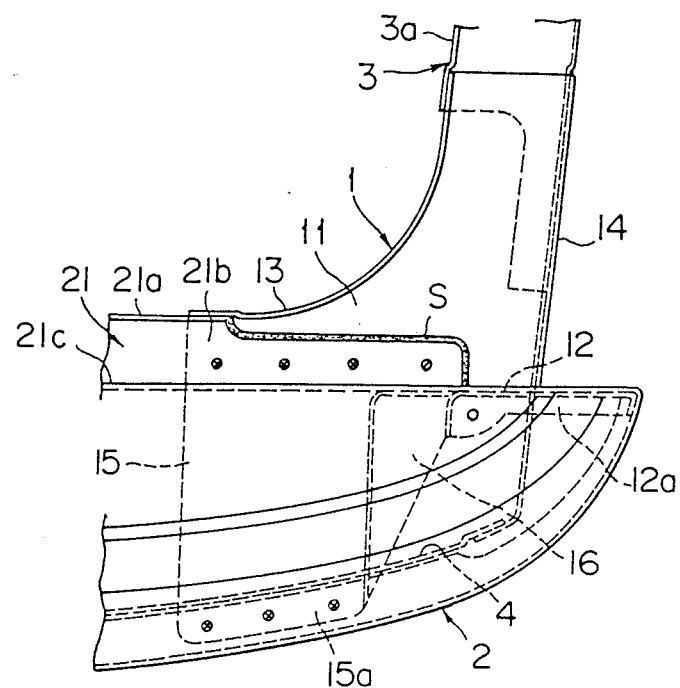
FIG. 2 is a plan view cut away by line X in FIG. 1 in a first example of the present invention.
Figure 3:
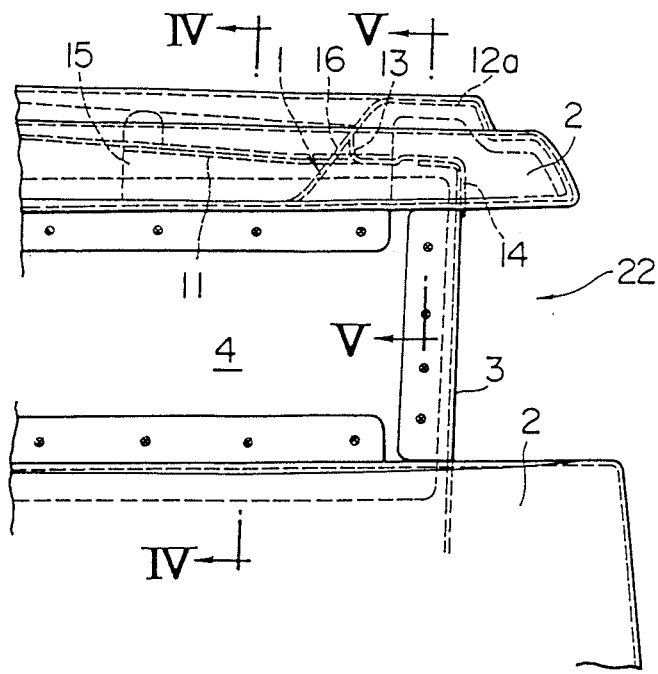
FIG. 3 is a side view shown in FIG. 2.

In the structure described above, a closed sectional portion 6 is partially formed by the sidewise extension planar portion 15 of the patch 1 and the upper portion of the rear quarter panel outer 2 above the upper part of the recessed portion 22 of the rear quarter panel outer 2. Furthermore, the forwardly declining portion 16 functions as a nodal plate of the closed sectional portion 6 as shown in FIGS. 2 and 3. As a result, the transmission of the load (stress) arising from a twisting of the vehicle body is improved as indicated by arrows in FIG. 4. Thus, the rigidity of the rear end portion of the rear quarter panel outer is increased, whereby the drive feeling or driveability of the vehicle is improved.

Still another advantage afforded by the above described structure is as follows. In order to prevent penetration of water through the joint between the rear part of the water drainage trough 21 and the planar portion 11 of the patch 1 and the joints between other plates, these joints are coated with a sealing compound S. Because of the improvement in rigidity as described above, there is almost no possibility of cracking of the sealing compound S, thereby substantially preventing the vehicle from corrosion.

The advantageous features afforded by the present invention as described above become more effectively pronounced particularly when the invention is applied to an automotive vehicle which has a large and long rear combination lamp along the rear quarter panel outer of the vehicle.

Figure 7:
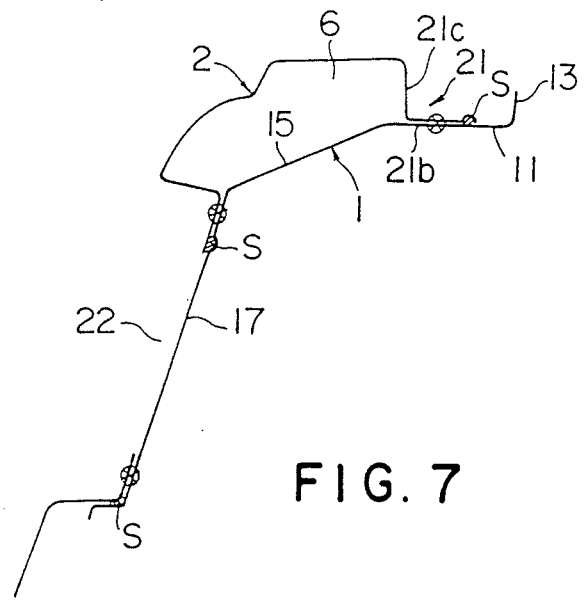
FIG. 7 is a sectional rear view similar to FIG. 4 showing a second example of the invention.
Figure 8:
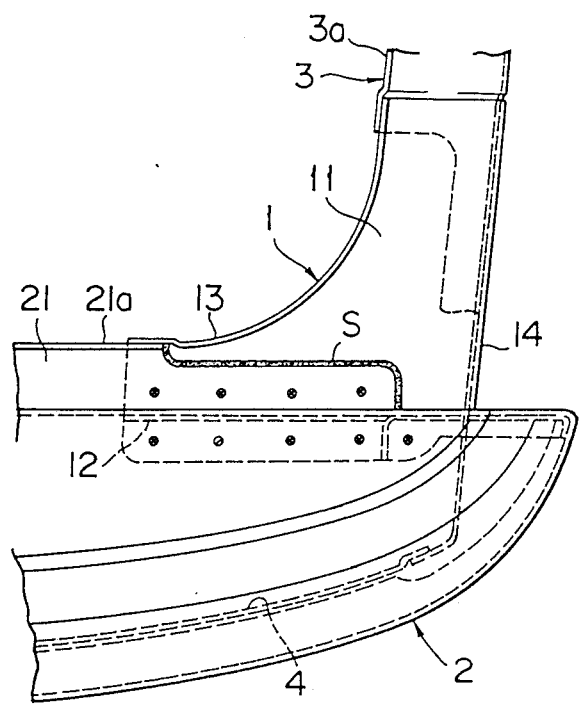

In another example of the present invention, as shown in FIG. 7, a descending plate 17 is extended from the side edge of the sidewise extension planar portion 15 of the patch 1. The plate 17 constitutes the inner wall of the recess 22 for mounting the rear combination lamp 5. The plate 17 is secured at its upper and lower edges respectively to the upper and lower walls of the recess 22 by spot welding. The descending plate 17 may be utilized as a mounting bracket for mounting the rear cc,mbination lamp 5. In this case, the bracket 4 shown in FIGS. 2, 3, and 4 becomes unnecessary. Thus, a reduction ir the number of parts can be realized.

The other structural features of the embodiment illustrated in FIG. 7 are the same as those of the preceding embodiment shown in FIGS. 2 through 6. In FIG. 7 those parts which are the same or equivalent to corresponding parts in FIGS. 2 through 6 are designated by the same reference numerals.

As described above, the present invention greatly improves the structural rigidity of a vehicle body in and around the rear quarter panel outer without an increase in the number of structural parts. The effectiveness of the present invention is particularly pronounced in its application particularly in the case of an automotive vehicle which has the large and long rear combination lamp extending around the side of the rear quarter panel outer.

While the presently preferred embodiments of the present invention have been shown and described, it is to be understood that the disclosures are for the purpose of illustration and that various changes and modifications may be made without departing from the scope of the invention as set forth in the appended claims.

What is claimed is:

1. In a body structure of an automotive vehicle having a rear quarter panel outer with a recessed part for mounting a rear combination lamp, a rear skirt, and a patch including a member joining a rear portion of an upper part of the rear quarter panel outer and a side portion of an upper part of the rear skirt, the improvement of said patch which comprises:

a sidewise extension plate extended from a side edge of the member secured to an upper edge portion of the recessed part so as to define a closed sectional portion together with the upper part of the rear quarter panel outer.

2. The body structure of an automotive vehicle according to claim 1, wherein said patch further comprises:

a side bent-up plate upwardly extending from said side edge;

a top flange formed contiguously to an upper edge of said side bent-up plate; and a forwardly declining plate formed to contiguously join a forward edge of the side bent-up plate, a forward edge of said top flange, and a rear edge of said sidewise extension plate, thereby forming an integral structure thereof.

3. The body structure of an automotive vehicle according to claim 1, wherein said patch further comprises:

a descending plate extending from a side edge portion of the sidewise extension plate to define an inner wall of said recessed part and being secured at upper and lower edges thereof respectively to upper and lower wall portions of said recessed portion, thereby said descending plate being utilizable as a mounting bracket for mounting said rear combination lamp.

4. The body structure of an automotive vehicle according to claim 1, further comprising:

a mounting bracket secured at upper and lower portions thereof respectively to upper and lower edge portions of said recessed portion for mounting said rear combination lamp.

* * * * *